United States Patent [19]
Upmeier et al.

[11] 3,877,720
[45] Apr. 15, 1975

[54] AIR-BAG SYSTEM

[75] Inventors: Horst Gradahrend Gent Upmeier, Leopoldshohe 3; Ulrich Seiffert, Braunschweig, both of Germany

[73] Assignee: Volkswagenwerk Aktiengesellschaft, Wolfsburg, Germany

[22] Filed: Nov. 27, 1972

[21] Appl. No.: 309,881

[30] Foreign Application Priority Data
Nov. 27, 1971 Germany............................ 2158930

[52] U.S. Cl........... 280/150 AB; 180/103; 340/52 H
[51] Int. Cl............................................. B60r 21/08
[58] Field of Search...... 280/150 AB; 340/52 H, 61; 180/103

[56] References Cited
UNITED STATES PATENTS

| | | | |
|---|---|---|---|
| 3,552,768 | 1/1971 | Kaiser | 180/103 |
| 3,629,816 | 12/1971 | Gillund | 180/103 |
| 3,633,159 | 1/1972 | Dillman | 180/91 |
| 3,639,710 | 2/1972 | Haruna | 280/150 AB |
| 3,655,929 | 4/1972 | Engel | 280/150 AB |
| 3,668,627 | 6/1972 | Brainerd | 180/103 |
| 3,714,627 | 1/1973 | Dillman | 340/52 H |
| 3,744,815 | 7/1973 | Scherenberg | 280/150 AB |

*Primary Examiner*—David Schonberg
*Assistant Examiner*—John P. Silverstrim
*Attorney, Agent, or Firm*—Brumbaugh, Graves, Donohue & Raymond

[57] ABSTRACT

A sensor activated air bag safety device including an AND gate arrangement which determines whether or not the safety device was activated as a result of an accident. The AND gate arrangement includes a means for recording the determination.

8 Claims, 1 Drawing Figure

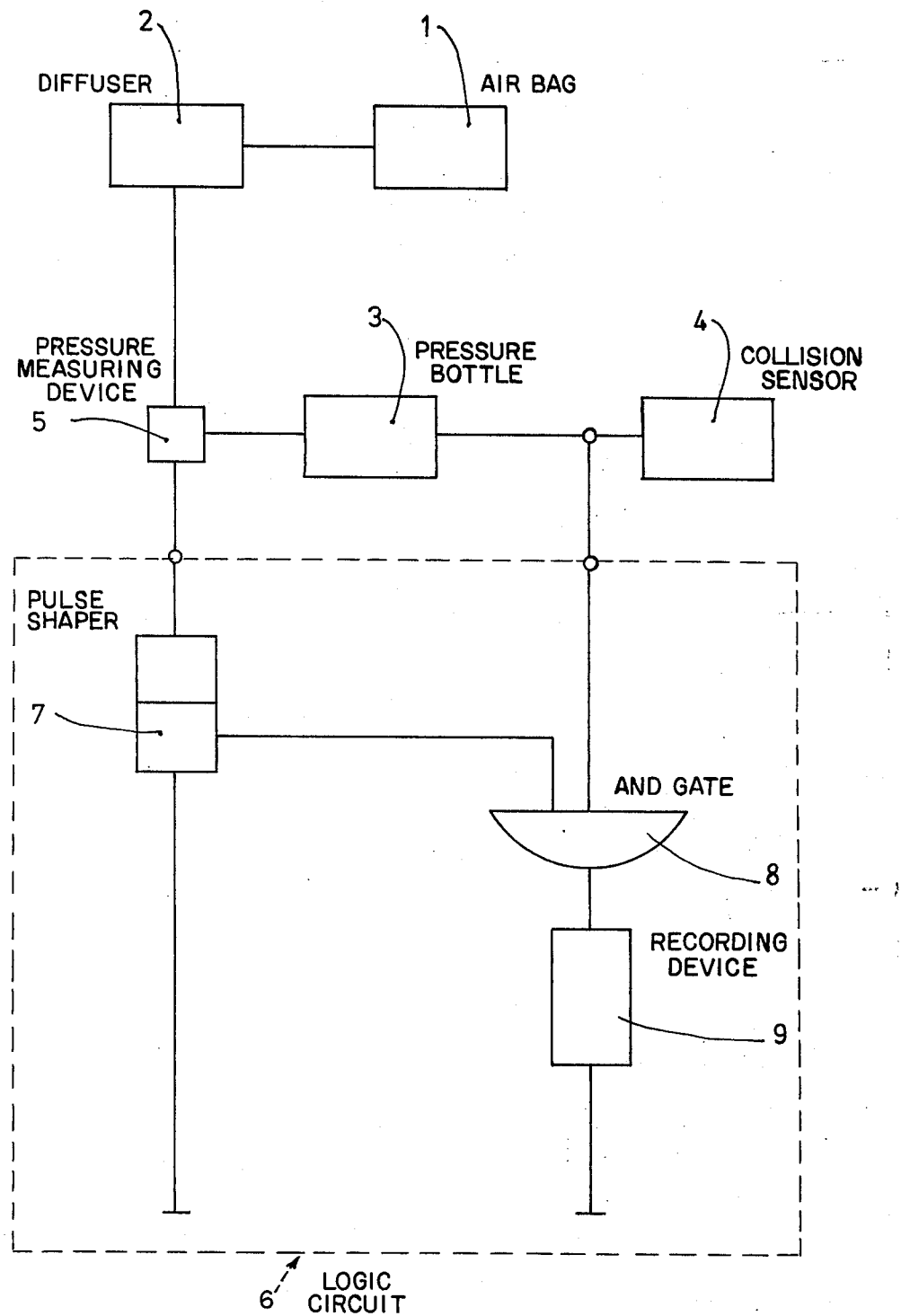

AIR-BAG SYSTEM

BACKGROUND OF THE INVENTION

The invention relates to safety devices and more particularly to expandable bag devices which provide protection to the occupants of a vehicle when it is involved in an accident.

Safety devices comprised of expandable bags known as air bags may be used for the purpose of protecting the occupants of a vehicle from being thrust against interior parts of the vehicle in the event of deceleration caused by an accident. Air bags which are blown up by means of a gas delivery device have become known through, among others, German Pat. No. 1,280,072 and published German Pat. application No. 1,942,154 and 1,955,145. These safety devices are activated by collision sensors.

The collision sensors should activate the safety device only in the event of a deceleration caused by an accident. If without being activated by the collision sensor, the air bag should inflate, an accident may be caused. In such cases the manufacturer, among others, could be held liable without being sensor-induced, accidental inflation may occur, for example, by a mechanical valve failure opening the air passage to the bag in any one of the devices known in the art, or by accidental explosion of an actuating explosive charge in known devices using that manner of activation. An indication that this has occurred is useful to show that inflation resulted from an other-than-sensor failure.

SUMMARY OF THE INVENTION

It is a general object of the present invention to provide a means of determining whether or not an air bag safety device was improperly activated.

This object as well as other objects which will become apparent in the discussion that follows are achieved, according to the present invention, by providing an air bag which may be expanded by means of a gas delivery device and apparatus to indicate the propriety of activation. The gas delivery device is activated by a sensor which also is connected to a logic means. A pressure measuring device is provided in the gas delivery system to detect changes in pressure resulting from delivery of gas. The output connection of the pressure measuring device also is connected to the logic means. When an accident occurs, both the sensor and the pressure measuring device provide output pulses to the inputs of the logic means. This results in an output pulse from the logic means. The output connection of the logic means are connected with a recording device. Thus when an accident occurs the recording device will record an output pulse from the logic means. If no output is recorded, improper activation by a gas delivery malfunction would be indicated. Such a recording device is useful in determinations of manufacturer liability.

In a preferred embodiment of the present invention the logic means consists of an AND gate, the inputs of which are connected with a sensor and a pressure measuring device, and the output connection of which is connected with a recording means consisting of a fuse.

BRIEF DESCRIPTION OF THE DRAWING

A more complete understanding of the invention may be had from the following detailed description of the preferred embodiment illustrated in the accompanying drawing. The single FIGURE of the drawing is a diagrammatic representation of the circuit and pneumatic connections of the improved air bag system.

DESCRIPTION OF THE PREFERRED EMBODIMENTS

An air bag 1 is filled conventionally by way of a diffuser 2 from a pressure bottle 3 following activation by a known collision sensor 4. In order to facilitate determination of the propriety of activation, there is provided between the pressure bottle 3 and the diffuser 2 a suitable pressure measuring device 5. The output connection of sensor 4 and the pressure measuring device 5 are connected to the input connections of a logic circuit 6.

The logic circuit 6 contains a suitable pulse shaper which, upon receiving a pulse from pressure measuring device 5, provides an appropriate output pulse for AND gate 8. An input connection of said pulse shaper is connected to the pressure measuring device 5, and the output connection is connected to one input connection of AND gate 8. The other input connection of AND gate 8 is connected to the sensor 4. The output connection of AND gate 8 is connected to the recording device 9.

When a collision occurs the sensor will provide a pulse to both the pressure bottle and one input connection of the AND gate. The pulse to the pressure bottle will cause a release of pressure into the air bag and a change in pressure will be indicated by the pressure measuring device. The pressure measuring device will then provide a pulse to the other input connection of the AND gate. When both input connections to the AND gate are provided with a pulse in this manner, the AND gate will produce an output current to the fuse. The fuse is rated below the output amperage so that it will burn out when activation of the safety device results from such collision circumstances.

The following is an example of how the air bag safety device might be improperly activated. If hard braking caused bag inflation by, e.g., a valve failure or any release of pressure from the pressure bottle and passage of air to the bag, the pressure measuring device would then provide a pulse to one input of the AND gate. Since the AND gate will only produce an output pulse as a result of a pulse to each input, the fuse will not burn out. In logic circuitry the failure to produce a voltage or current output is, itself, a binary information bit. Both actual and zero outputs are referred to herein, then, as output indications. The unburned fuse thus would show that the air bag safety device was not activated as the result of collision.

The operation of the preferred embodiment may be illustrated as follows:

| | Input | | Output Indication to |
|---|---|---|---|
| Sensor | | Pressure | Recording device |
| 1. + | | 0 | 0 |
| 2. + | | + | + |
| 3. 0 | | + | 0 |

The plus (+) indicates a pulse or output current or voltage from the sensor, pressure measuring device, or the final output indication produced by the AND gate. A zero (0) indicates no pulse or output current or voltage. Condition 1 illustrates the case where there is an accident but the sensor fails to activate the pressure bottle or where the pressure bottle was not pressurized as shown, the output indication is zero (0). Condition 2 illustrates the case of proper activation as described above the output indication is plus (+). Condition 3 illustrates the case of improper activation, an example of which is described above the output indication is again zero (0).

It will be understood that the above description of the present invention is susceptible to various modifications, changes and adaptations as will occur to those skilled in the art. It is therefore intended that the scope of the invention be limited only by the following claims.

We claim:
1. Air bag safety apparatus, comprising, in combination:
   a. gas delivery means for expanding an air bag;
   b. sensor means connected to the gas delivery means for activating said gas delivery means to expand the bag in response to a sensed condition; and
   c. logic means connected with said sensor means and said gas delivery means for providing one output indication in the event that inflation of the air bag is the result of an activation by said sensor means and for providing another output indication in the event that inflation of the air bag is not the result of an activation by said sensor means.

2. The apparatus defined in claim 1, wherein said logic means has an output connection connected with means for recording the output.

3. The apparatus defined in claim 2 wherein the recording means is a fuse which is rated below the output amperage of said logic means thereby being burned out upon output from said logic means.

4. The apparatus defined in claim 1, wherein a pressure measuring device is connected with said gas delivery means for detection of changes in pressure resulting from air bag inflation, said pressure measuring device having an output connection to said logic means, said changes in pressure causing said pressure measuring device to deliver an output pulse for use by said logic means.

5. The apparatus defined in claim 4, wherein said logic means has two, input connections, one input connection being connected with an output connection of said sensor means while the other logic means input connection is connected with the output connection of said pressure measuring device whereby said logic means will provide an electrical output pulse as said first output indication only as a result of simultaneous input pulses to both input connections of said logic means, said second output indication being the absence of an output pulse.

6. The apparatus defined in claim 4, wherein said logic means is comprised of a logic circuit which contains an AND gate.

7. The apparatus defined in claim 6, wherein said logic circuit includes a pulse shaper connected between said pressure measuring device and said AND gate so as to provide a suitable output to said AND gate.

8. The apparatus defined in claim 1, wherein said gas delivery means includes a bottle of compressed air.

* * * * *